United States Patent

White

[15] 3,647,519
[45] Mar. 7, 1972

[54] METHOD FOR METALLIZING BERYLLIUM OXIDE AT LOW TEMPERATURES

[72] Inventor: John M. White, Gainesville, Fla.
[73] Assignee: Sperry Rand Corporation
[22] Filed: Sept. 26, 1969
[21] Appl. No.: 861,454

[52] U.S. Cl. ..................117/71 R, 29/473.1, 106/1, 117/160 R, 117/217, 117/227
[51] Int. Cl. ..........................B44d 1/02, C23c 3/00
[58] Field of Search ..............117/71 R, 160 R; 106/1

[56] References Cited

UNITED STATES PATENTS

| | | | |
|---|---|---|---|
| 2,776,472 | 1/1957 | Mesick, Jr. | 117/71 R UX |
| 2,857,664 | 10/1958 | Luks et al. | 117/71 R X |
| 2,938,806 | 5/1960 | Padula | 117/71 R X |
| 2,985,547 | 5/1961 | Luks | 117/160 R |
| 2,996,401 | 8/1961 | Welch et al. | 117/71 R X |
| 3,051,592 | 8/1962 | Woerner | 117/160 R X |
| 3,189,476 | 6/1965 | Cowan | 117/160 R X |
| 3,352,694 | 11/1967 | Reed et al. | 117/160 R X |

FOREIGN PATENTS OR APPLICATIONS

| | | | |
|---|---|---|---|
| 1,362,533 | 4/1964 | France | 106/1 |
| 63-14,282 | 8/1963 | Japan | 117/71 R |

*Primary Examiner*—Ralph S. Kendall
*Assistant Examiner*—J. R. Batten, Jr.
*Attorney*—S. C. Yeaton

[57] ABSTRACT

A method for bonding a metallizing coating to beryllium oxide comprising applying a metallizing paint to the beryllia. The paint, which comprises molybdenum trioxide and a glass frit in an alcohol suspension, is sintered at a temperature in the range from about 1,000° C. to about 1,200° C. A metallizing coating is then bonded to the sintered paint.

1 Claim, No Drawings

METHOD FOR METALLIZING BERYLLIUM OXIDE AT LOW TEMPERATURES

BACKGROUND OF THE INVENTION

Prior art methods for metallizing beryllia are known which usually subject the beryllia to temperatures in excess of 1,400° C. Such methods, for example, may include the conventional molybdenum-manganese technique for metallizing beryllia. A problem inherent in such prior art techniques is that beryllia produces extremely toxic vapors and dust when subjected to temperatures in excess of 1,200° C. in an atmosphere of wet hydrogen. Therefore, in the past, beryllia metallizing facilities have been isolated from all personnel and the facilities were required to include dust and vapor contamination control equipment. Such facilities, as well as the isolated installations required therefor, tend to be costly in comparison with ceramic metallizing facilities wherein the ceramic to be metallized does not produce toxic substances. In addition, facilities of this type, for metallizing beryllia, require expensive high temperature furnaces.

An additional problem may be encountered in installations which are equipped to metalize ceramics other than beryllia and where it may be desirable to include a beryllia metallizing facility. Such installations may require dual facilities; the existing facility for metallizing the ceramics other than beryllia and an additional isolated facility for metallizing the beryllia, which is obviously expensive.

Metallized beryllia is preferred for a number of applications including, for example, in the manufacture of electrically insulated microwave tube electrodes wherein a beryllia insulator is brazed to a metal electrode structure. Beryllia has been found to be an ideal electrical insulator in such applications where good thermal conductivity through the insulator is required. Beryllia is known to have approximately eight times the thermal conductivity of, for example, alumina.

In addition to the conventional molybdenum-manganese method for metallizing beryllia, techniques are known for metallizing other ceramics, for example, alumina, which techniques usually utilize temperatures substantially in excess of 1,200° C. Such a method may be of the type disclosed in copending patent application No. 800,649, filed on Feb. 19, 1969, in the name of Robert W. Buck and assigned to the present assignee. This method, in practical applications, usually utilizes a sintering temperature substantially in excess of 1,200° C. and usually iround 1,400 °C., thus being subject to the disadvantages discussed above. In addition, the method disclosed in the cited patent application includes a molybdenum-manganese metallizing step not required in the present method.

SUMMARY OF THE INVENTION

In accordance with the method of the present invention, a metallizing coa,ing is bonded to beryllia where the beryllia is subject to temperatures in the range of about 1,000° C. to about 1,200° C. A metallizing paint comprising molybdenum trioxide and a glass frit in an alcohol suspension is applied to the beryllia. The glass frit may constitute from about 2% to about 30% of the paint by weight. The paint is sintered at a temperature preferably in the range from about 1,000° C. to about 1,200° C. A metallizing coating may then be bonded to the sintered paint by any known process, for example, by reduction reaction.

Since the beryllia is not subject to temperatures in excess of 1,200° C., toxic vapors and dust are not generated as with the prior art methods previously discussed. Therefore, expensive dust and vapor contamination control equipment is not required for practicing the present invention and the requirement for costly high temperature furnaces has been obviated.

Additionally, existing low-temperature facilities for metallizing ceramics other than beryllia may be utilized, without alteration, for the metallizing of beryllia.

The present method has been found to produce metallized beryllia components which have been subsequently brazed to metal structures with bonds having high tensile strengths.

DESCRIPTION OF THE PREFERRED EMBODIMENT

The method of the present invention is applicable to any grade of beryllia that may commercially be procured. The beryllia to be metallized may initially be cleaned in any conventional manner. A metallizing paint is applied to the surfaces of the beryllia to be metallized. The metallizing paint comprises an alcohol suspension of molybdenum trioxide, glass frit, and nitro-cellulose binder. Manganese dioxide and copper oxide optionally may be present. The paint is sintered at a temperature in the range of about 1,000° C. to about 1,200° C. in a wet hydrogen atmosphere. It is thought that the glass frit may be molten at the sintering temperature and in the molten state may react rapidly with the beryllia thus combining chemically therewith.

After sintering, loose metallizing is removed by burnishing with a stainless steel wire brush. Preferably, a second or third coat of the same metallizing paint is applied, sintered, and burnished as before.

Metallizing coating may now be bonded to the sintered paint in any conventional manner. For example, a slurry of nickel oxide in an alcohol suspension may be applied to the sintered paint. The nickel oxide may be reduced to nickel plating by firing the slurry in a wet hydrogen atmosphere at a temperature of 1,100° C.

The metallized ceramic paint may then be brazed to a metal structure in any conventional manner which may utilize, for example, copper or gold alloy brazing solder.

Structures with beryllia to metal brazes having high tensile strength have been fabricated utilizing the method of the present invention wherein the metallizing paint had the following specific composition: an alcohol suspension of molybdenum trioxide, manganese dioxide, a glass frit, and copper oxide, constituting respectively 72.0%, 18.9%, 9.0% and 0.1% of the paint by weight. The frit composition comprised calcium oxide, magnesium oxide, alumina and silica, constituting respectively 3.3%, 16.1%, 19.6% and 61.0% of the frit composition by weight. The metallizing paint additionally included a nitro-cellulose binder.

While the invention has been described in its preferred embodiment, it is to be understood that the words which have been used are words of description rather than limitation and that changes may be made without departing from the true scope and spirit of the invention in its broader aspects.

I claim:

1. A method for bonding a nickel metallizing coating to beryllia comprising the steps of
    applying a metallizing paint to said beryllia,
    said paint consisting of molybdenum trioxide, manganese dioxide, copper oxide and a glass frit in an alcohol suspension, said molybdenum trioxide, manganese dioxide, copper oxide and glass frit constituting respectively about 72.0%, 18.9%, 0.1% and 9.0% of said paint by weight,
    said glass frit consisting of calcium oxide, magnesium oxide, alumina and silica with said calcium oxide, magnesium oxide, alumina and silica constituting respectively about 3.3%, 16.1%, 19.6% and 61.0% of said frit by weight,
    sintering said paint in a wet hydrogen atmosphere at a temperature in the range of from about 1,000° C. to about 1,200° C., and
    bonding said nickel to the sintered paint.

* * * * *